US012731012B2

(12) United States Patent
Richter et al.

(10) Patent No.: US 12,731,012 B2
(45) Date of Patent: Sep. 8, 2026

(54) EVENT-DRIVEN SPIKING CONVOLUTIONAL NEURAL NETWORK

(71) Applicant: CHENGDU SYNSENSE TECHNOLOGY CO., LTD., Chengdu (CN)

(72) Inventors: Ole Juri Richter, Haunetal (DE); Ning Qiao, Glattpark (CH); Qian Liu, Otelfingen (CH); Sadique Ul Ameen Sheik, Schlieren (CH)

( * ) Notice: Subject to any disclaimer, the term of this patent is extended or adjusted under 35 U.S.C. 154(b) by 1278 days.

(21) Appl. No.: 17/601,939

(22) PCT Filed: Apr. 6, 2020

(86) PCT No.: PCT/EP2020/059798

§ 371 (c)(1),
(2) Date: Oct. 7, 2021

(87) PCT Pub. No.: WO2020/207982

PCT Pub. Date: Oct. 15, 2020

(65) Prior Publication Data

US 2022/0188597 A1 Jun. 16, 2022

(30) Foreign Application Priority Data

Apr. 9, 2019 (EP) .................................... 19168271
Jun. 17, 2019 (EP) .................................... 19180569

(51) Int. Cl.
*G06N 3/04* (2023.01)
*G06N 3/049* (2023.01)
(Continued)

(52) U.S. Cl.
CPC ............ *G06N 3/049* (2013.01); *G06N 3/063* (2013.01)

(58) Field of Classification Search
CPC .......... G06N 3/049; G06N 3/06; G06N 3/063; G06N 3/065
See application file for complete search history.

(56) References Cited

U.S. PATENT DOCUMENTS

2011/0145486 A1* 6/2011 Owa .................. G06F 12/0246 711/E12.008
2015/0242745 A1* 8/2015 Wang ...................... G06N 7/01 706/25

(Continued)

FOREIGN PATENT DOCUMENTS

JP 2017509978 4/2017
JP 2018136919 8/2018

OTHER PUBLICATIONS

Yousefzadeh et al., "Fast Pipeline 128×128 pixel spiking convolution core for event-driven vision processing in FPGAs" international conference on event-based control, communication, and signal processing, Jun. 17, 2015, pp. 1-8 (Year: 2015).*

(Continued)

*Primary Examiner* — Paulinho E Smith
(74) *Attorney, Agent, or Firm* — Michael D. Eisenberg; MDE Patents

(57) ABSTRACT

A neural network has a plurality of layers. Each layer includes a kernel module configured to store and to process in an event-driven fashion kernel values of at least one convolution kernel; a neuron module configured to store and to process in an event-driven fashion neuron states of neurons of the network; and a memory mapper configured to determine neurons to which an incoming a spike event from a source layer projects to a convolution, with the at least one convolution kernel. Neuron states of said determined neurons are updated with applicable kernel values of the at least
(Continued)

Figure 1:
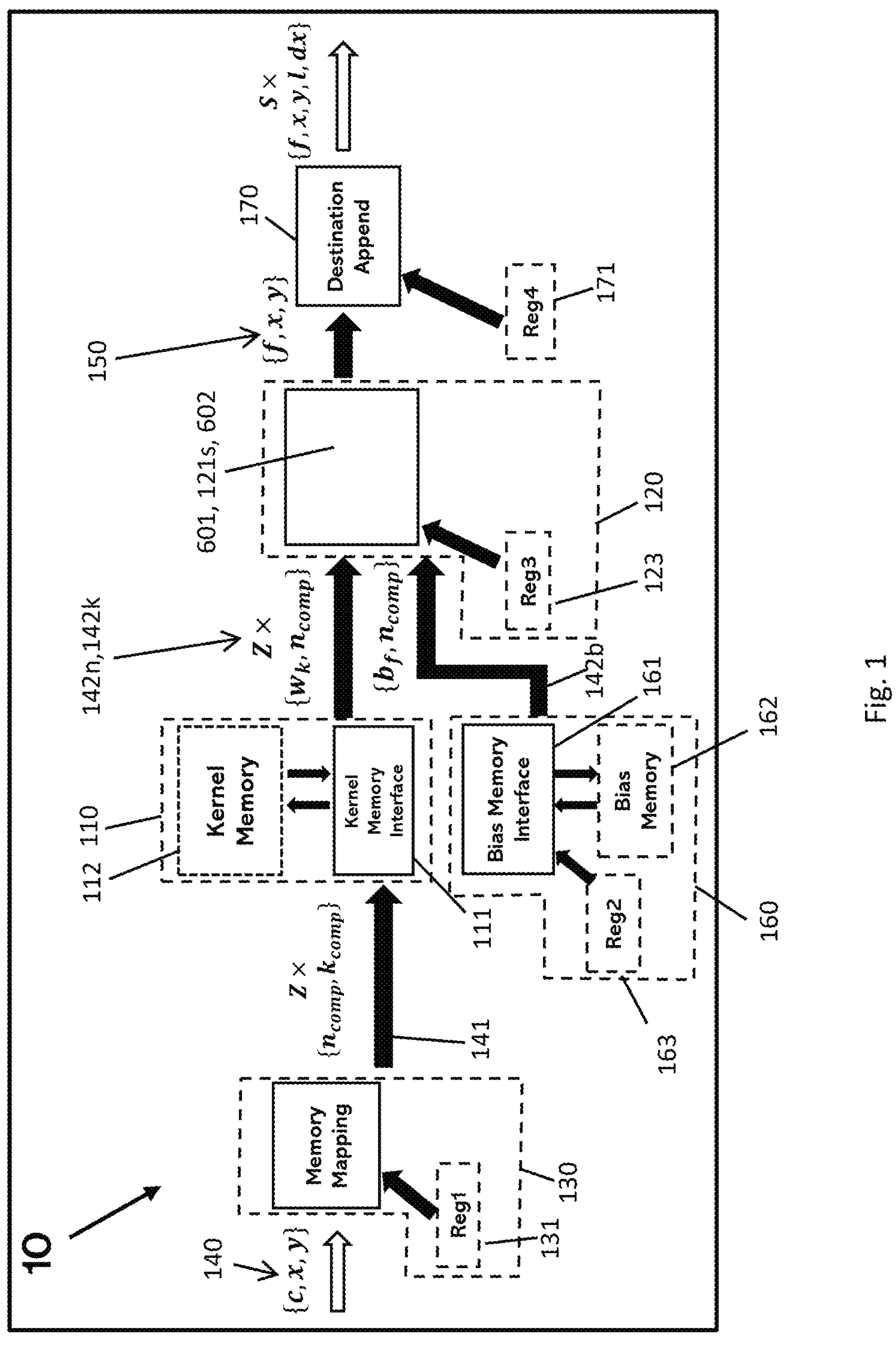

one convolution kernel. The memory mapper is configured to process incoming spike events in an event-driven fashion.

30 Claims, 6 Drawing Sheets

(51) Int. Cl.
*G06N 3/06* (2006.01)
*G06N 3/063* (2023.01)

(56) References Cited

U.S. PATENT DOCUMENTS

| | | | | |
|---|---|---|---|---|
| 2016/0054938 | A1* | 2/2016 | Owa | G06F 3/0616 711/103 |
| 2016/0364644 | A1 | 12/2016 | Brothers | |
| 2017/0200078 | A1 | 7/2017 | Bichler | |
| 2018/0137408 | A1 | 5/2018 | Mailhot | |
| 2019/0122110 | A1* | 4/2019 | Ruckauer | G06N 3/049 |
| 2021/0027152 | A1 | 1/2021 | Van Der Made | |
| 2021/0182077 | A1* | 6/2021 | Chen | G06F 40/263 |

OTHER PUBLICATIONS

Yousefzadeh et al "Fast Pipeline 128x128 pixel spiking convolution core for event-driven vision processing in FPGAs" international conference on event-based control, communication, and signal processing, Jun. 17, 2015, pp. 1-8.
Merolla, Paul A., et al. "A million spiking-neuron integrated circuit with a scalable communication network and interface." Science 345.6197 (2014): 668-673, Aug. 8, 2014.
Davies, Mike, et al. "Loihi: A neuromorphic manycore processor with on-chip learning." IEEE Micro 38.1 (2018): 82-99, Jan. 16, 2018.
Camunas-Mesa, Luis, et al. "An event-driven multi-kernel convolution processor module for event-driven vision sensors." IEEE Journal of Solid-State Circuits 47.2 (2011): 504-517, Oct. 19, 2011.
Camunas-Mesa, Luis A., et al. "A configurable event-driven convolutional node with rate saturation mechanism for modular convnet systems implementation." Frontiers in neuroscience 12 (2018): 63, 2018-02-20.
Tapiador-Morales, Ricardo, et al. "Neuromorphic LIF row-by-row multiconvolution processor for FPGA." IEEE transactions on biomedical circuits and systems 13.1 (2018): 159-169, Nov. 7, 2018.
Cheung, Kit, Simon R. Schultz, and Wayne Luk. "NeuroFlow: a general purpose spiking neural network simulation platform using customizable processors." Frontiers in neuroscience 9 (2016): 516, Jan. 14, 2016.
Pérez-Carrasco, José Antonio, et al. "Mapping from frame-driven to frame-free event-driven vision systems by low-rate rate coding and coincidence processing—application to feedforward ConvNets." IEEE transactions on pattern analysis and machine intelligence 35.11 (2013): 2706-2719, Apr. 11, 2013.
Thomas, David, and Wayne Luk. "FPGA accelerated simulation of biologically plausible spiking neural networks." 2009 17th IEEE symposium on field programmable custom computing machines. IEEE, 2009, Apr. 7, 2009.
Podobas, Artur, and Satoshi Matsuoka. "Designing and accelerating spiking neural networks using OpenCL for FPGAs." 2017 International Conference on Field Programmable Technology (ICFPT). IEEE, 2017, Dec. 13, 2017.
Bouvier, Maxence, et al. "Spiking neural networks hardware implementations and challenges: A survey." ACM Journal on Emerging Technologies in Computing Systems (JETC) 15.2 (2019): 1-35, Apr. 5, 2019.
Liu, Qian, et al. "Live demonstration: face recognition on an ultra-low power event-driven convolutional neural network ASIC." Proceedings of the IEEE/CVF Conference on Computer Vision and Pattern Recognition Workshops. 2019, Jun. 17, 2019.
Pearson, Martin J., et al. "Design and FPGA implementation of an embedded real-time biologically plausible spiking neural network processor." International Conference on Field Programmable Logic and Applications, 2005 . . . IEEE, 2005, Aug. 26, 2005.

* cited by examiner 411
410, K1
410, K2
420, 422
140, 421
430, OFM1
440, SFM
A
430, OFM2
B
431
422
C
140, 421
430, OFM1
410, K1
440,SFM
D
410, K2
440,SFM
430, OFM1
E
430, OFM2
F
G
H

EVENT-DRIVEN SPIKING CONVOLUTIONAL NEURAL NETWORK

CROSS-REFERENCE TO RELATED APPLICATIONS

This is the U.S. National Stage of International Patent Application No. PCT/EP2020/059798 filed on Apr. 6, 2020, which in turn claims the benefit of European Patent Application No. 19168271.5 filed on Apr. 9, 2019, and European Patent Application No. 19180569.6 filed on Jun. 17, 2019.

The invention relates to an event-driven spiking convolutional neural network, a computer program for controlling the event-driven-spiking convolutional network and a memory mapper for an event-driven convolutional neural network.

Convolutional neural networks (CNNs) and corresponding chip architectures for efficient execution of CNN tasks are known in the art.

A specific class of CNNs comprises spiking convolutional networks (sCNNs) that mimic the function of biological neurons with regard to their discontinuous signaling behavior in form of electric spikes that are generated, when a certain membrane potential of the neuron is reached, which stands in contrast to conventional CNNs that provide a continuous output upon any input, which renders them less energy efficient than sCNNs.

In turn, while sCNNs are mathematically well-described, the implementation in dedicated hardware is not known. SCNNs that are implemented on a general-purpose processor lose their advantage of the specific mode of data processing and are thus comparably slow or associated to a particularly high memory requirement.

However, as of now no dedicated electronic circuits exist that are specifically designed for operating a sCNN.

A general (not necessarily convolutional) neural network is taught be the IBMs "true north" chip architecture (US 2014/0032465 A1) based on a so-called cross-bar architecture that provides the ability to interconnect each neuron to each other neuron of a neural network in almost any fashion. However, this comes at the expense of an extremely large memory requirement, as each connection between the neurons carries an associated weight. Thus, as each neuron is interconnected with all other neurons, the memory requirements for the weight matrix comprising all weights scales approximately with the number of neurons square, which becomes quickly unfeasible.

Moreover, apart from the true north architecture, the known processors for CNNs operate in a frame-based fashion, which is an opposite mode of signal processing (frame-based vs event-based) of what would be advantageous when dealing with sCNNs.

As of today, there is no electronic circuit architecture that is specifically designed for the efficient and rapid execution of sCNNs.

An object of the present invention is to provide a system for executing a spiking convolutional network in an energy and memory efficient manner. The object is achieved by the device having the features of claim 1.

Advantageous embodiments are described in the dependent claims.

In the following, the term "spiking convolution neural network" and similar terms refer to at least one electronic circuit configured and arranged for operating a spiking convolutional neural network, if not stated or suggested otherwise.

According to claim 1, an event-driven spiking convolutional neural network (sCNN), comprises a plurality of layers, wherein each layer comprises

- a kernel module configured to store and to process in an event-driven fashion kernel values of at least one convolution kernel,
- a neuron module configured to store and to process, particularly to update, in an event-driven fashion neuron states of neurons of the network, and particularly to output spike events generated from the processed, e.g. updated neurons,
- a memory mapper configured to determine neurons to which an incoming spike event from a source layer projects to by means of a convolution with the at least one convolution kernel and wherein neuron states of said determined neurons are to be updated with applicable kernel values of the at least one convolution kernel, wherein the memory mapper is configured to process incoming spike events in an event-driven fashion.

The event-driven sCNN is particularly an electronic circuit and/or at least one computer chip comprising components such as the memory mapper, the neuron module and the kernel module. Each component particularly has a hard-wired correspondence in the electronic circuit or the at least one computer chip.

That is, while some components of the sCNN might be programmable, the components are particularly not only reflected or implemented in a computer program or in software that is then executed for example on a general multi-purpose chip, i.e. the components of the sCNN are not virtual and are not put to work in a general computer chip, but are physical entities of the electronic circuit of the sCNN.

The term "layer" particularly refers to at least one electronic circuit that represents a layer in the sCNN, particularly to a layer in the common terminology of CNNs.

The event-driven sCNN according to the invention particularly comprises a limited and predefined number of layers.

In contrast to conventional CNNs the components of the event-driven sCNN are particularly configured to process information in an event-driven fashion.

An event that drives the sCNN is particularly given by a spike event that is received by one of the layers of the sCNN.

A spike event is particularly digital data that comprise structured information about the event.

Thus, in contrast to other CNNs the event-driven sCNN operates particularly not frame- or clock-based, it is thus suited to conform to data streams as for example provided by event-generating dynamic vision cameras and other event-generating devices.

The kernel module stores kernel values of at least a single convolution kernel—sometimes referred to as "kernel" only in the current specification—that is particularly applicable to all incoming spike events.

This allows the kernel module to hold ready a comparable small associated kernel memory to store the kernel values of the at least one convolution kernel.

Particularly in contrast to a general neural network, the provision of at least one convolution kernel reduces the memory requirement for the sCNN, as the neuron connections in the sCNN are characterized by a smaller set of weights.

It is common for the event-driven sCNN to have a plurality of convolution kernels stored in the kernel module.

The neuron module essentially stores all neurons of the layer, wherein the neurons are particularly associated to output feature maps of the layer.

Each neuron is particularly comprised in an output feature map, wherein a location of the neuron in the output feature map is particularly given by a neuron coordinate.

The output feature map is particularly a two-dimensional array of values, wherein the values correspond to the neuron states of the neurons.

The term “neuron” refers to an entity of the sCNN that is particularly characterized in that it comprises a neuron state that is adjustable and wherein said neuron state is subject to a function that characterizes the way when and how a neuron outputs a spike event.

Also, the neuron module is operated in an event-driven fashion.

Particularly with each incoming spike event at least some neurons of the neuron module are updated (i.e. processed) with specific kernel values and depending on their neuron state (which is sometimes referred to a membrane potential in the art) output a spike event themselves.

The updating process particularly comprises an addition or a subtraction of a neuron state that is stored at the respective neuron address with the applicable kernel value and particularly a calculation involving a bias value.

It is noted that the neuron module is configured to store and to process the neuron states of the neurons of the network, and depending on the states of the updated neurons, the neuron module might output one or more spike events generated from the updated neurons.

In general, not each updated neuron will output a spike event.

According to another embodiment of the invention, the kernel module comprises a kernel interface connected to an associated kernel memory, wherein the associated kernel memory is configured to store the kernel values of the at least one convolution kernel in kernel addresses, particularly of a plurality of convolution kernels, wherein the kernel module is electronically connected to the neuron module.

The associated kernel memory comprises or is particularly a memory that is physically comprised by, e.g. arranged on, each layer. This has the advantage that each layer can be manufactured identically and operates as an autonomous unit.

Alternatively or additionally, the associated kernel memory comprises or is a memory that is allocated and connected to the layer but particularly not necessary comprised by the layer. The associated kernel memory can be comprised in a global, particularly external kernel memory that is connected to the kernel module of the layer.

According to one embodiment, all layers of the sCNN are connected to the global kernel memory, wherein the global kernel memory comprises for each layer the associated kernel memory.

The kernel address particularly refers to a kernel memory address, where a single kernel value is stored.

According to another embodiment of the invention, the neuron module comprises a neuron memory, wherein the neuron memory is configured to store the neuron states of the neurons in neuron addresses.

According to another embodiment, the neuron memory comprises a plurality of neuron memory units that are accessible in a parallel fashion. Such neuron memory unit is also referred to as an associated neuron memory in the specification.

The neuron memory, particularly each associated neuron memory comprises or is particularly a memory storage that is physically comprised, e.g. arranged on, each layer or a memory that is allocated and connected to the layer but particularly not necessary comprised by the layer. Additionally or alternatively, the associated neuron memory might be comprised in a global, particularly external neuron memory that is connected to the neuron module of the layer.

According to one embodiment, all layers of the sCNN are connected to the global neuron memory, wherein the global neuron memory comprises for each layer the associated neuron memory.

Moreover, the global kernel and the global neuron memory can be comprised by a single memory component.

The neuron address particularly refers to a neuron memory address where the neuron state of a neuron is stored.

According to another embodiment of the invention, the memory mapper is electronically connected to the kernel module, particularly to the kernel interface, wherein the memory mapper is configured and arranged a) to receive the incoming particularly single spike event from a source layer of the sCNN via an electronic connection, the incoming spike event comprising information on a coordinate of particularly a single neuron in the source layer, and in response to the received spike event, b) to determine neuron coordinates and corresponding neuron addresses, particularly in the associated neuron memory of the neurons to which a convolution of the received incoming spike event with the at least one convolution kernel projects to, c) to determine kernel coordinates with corresponding kernel addresses of the kernel values applicable to the neuron states of the determined neuron addresses, wherein the neuron states of the determined neuron addresses are to be updated with the applicable kernel values, particularly from the at least one convolution kernel or from the plurality of convolution kernels, d) to provide the determined kernel addresses for the applicable kernel values and particularly the determined neuron addresses to the kernel module, particularly to the kernel interface.

The memory mapper is particularly an electronic circuit or an electronic circuit system.

The memory mapper particularly computes where the incoming spike event projects to. This computation is particularly based on a particularly completely hard-wired formula that enables the memory mapper to determine the neuron addresses to be updated and the kernel addresses with the applicable kernel values.

In order to determine the neuron addresses and the kernel addresses, the memory mapper can be provided with programmable register values specifying the formula for said determination.

The memory mapper is particularly an event-driven, particularly asynchronous serial interface circuit having a predefined bandwidth parallel interface such that at least one spike event can be processed at a time.

The memory mapper is particularly an SRAM module, a flash memory or the like.

The source layer is particularly comprised by the sCNN. The source layer can even be the current layer when for example a spike event generated by the neuron module is rerouted to the memory mapper of the layer.

The term “projects to” and similar terms particularly refer to essentially an inverse of the receptive field of a CNN.

As the sCNN is event driven, the convolution operation can be performed particularly efficiently on single spike events.

According to another embodiment of the invention, the kernel module is configured and arranged to receive the determined kernel addresses particularly from the associated kernel memory and to provide, particular to output the applicable kernel values stored at the determined kernel addresses, particularly in conjunction with the determined neuron addresses, to the neuron module.

According to another embodiment of the invention, the neuron module is configured and arranged a) to receive the determined neuron addresses and the applicable kernel values, b) to determine for each received neuron address an updated neuron state for the neuron based on the applicable kernel value, c) to output an outgoing spike event for updated neurons reaching, i.e. particularly exceeding or falling below at least one predefined threshold value, particularly after the neuron state has been updated.

That is, if the neuron state reaches a predefined threshold, a spike event is generated.

The neuron state is particularly represented by a number.

The term "reaching" particularly refers to a falling below or an exceeding of the threshold value by the neuron state.

According to another embodiment of the invention, the memory mapper is configured and arranged to determine for each received incoming spike event at least one output feature map consisting of neurons assigned to the output feature map, wherein the number of output feature maps is equal to the number of convolution kernels of the current layer.

A feature map can be represented as a two-dimensional array of neurons that are addressable by their neuron coordinate. Each neuron has a neuron state.

An incoming spike event projects to the same number of feature maps as there are kernels in the layer.

According to this embodiment, each kernel gives rise to its associated output feature map.

According to another embodiment of the invention, each layer of the sCNN further comprises a destination mapper, wherein the destination mapper is connected to an output, particularly to a bus of the neuron module, and wherein the destination mapper is configured and arranged to dump an outgoing spike event and/or to generate an outgoing destination information of an outgoing spike event received from the neuron module of the current layer and to associate, particularly append said destination information to the outgoing spike event, particularly wherein the outgoing destination information comprises information on at least one destination layer comprised by the plurality of layers to which the outgoing spike event is to be delivered, particularly wherein the destination information comprises an information on the output feature map in which the spike event was generated, a neuron coordinate of the spike event in the output feature map, and/or an offset value with respect to a feature map index.

This embodiment allows each layer to autonomously determine the destination information such that the sCNN can be extended by adding more layers in a modular fashion.

According to another embodiment of the invention, the neuron module comprises a plurality of parallel-operating neuron sub-interfaces that are configured to process received neuron addresses and kernel values, and particularly received bias values and to generate updated neuron states and spike events, wherein each neuron sub-interface comprises an associated neuron memory for reading the neuron state for the received neuron address and to write the updated neuron state to the received neuron address in the associated neuron memory, such that a parallel processing of neuron state is achieved by the neuron sub-interfaces and their associated neuron memories.

As reading and writing processes on a memory usually is a comparable slow and time-consuming process this embodiment circumvents a potential bottleneck in processing speed of the network allowing an efficient and fast processing of spike events from previous layers. According to this embodiment the determined neuron addresses and the applicable kernel values are distributed to the plurality of neuron sub-interfaces for being processed in a parallel fashion.

According to another embodiment of the invention, the neuron module comprises a router module configured, adapted and connected to receive determined neuron addresses and applicable kernel values, and particularly bias values, particularly from the kernel module and/or the bias module, and to transmit the received neuron addresses and the kernel values, and particularly the bias values to the plurality of parallel-operating neuron sub-interfaces that are configured to process the received neuron addresses and kernel value, and particularly the bias values in parallel, wherein the neuron module further comprises a merger module configured and adapted to receive generated spike events from the plurality of neuron sub-interfaces and funnel the spike events for serial processing, particularly in a bus having less channels than neuron sub-interfaces, particularly wherein the bus has a single transmission channel only.

This embodiment allows for adapting a serial bus connection to the neuron module and a serial bus connection from the neuron module, while at the neuron module, parallel processing is facilitated.

According to another embodiment of the invention, each layer further comprises a bias module comprising an associated bias memory and particularly a bias interface connected to the associated bias memory, wherein the associated bias memory is configured to store bias values in bias addresses, wherein the bias module is connected to the neuron module and wherein the bias module is configured to provide in particularly predefined time-intervals bias values to the neuron module, wherein the neuron module, is configured to update the neuron states of all neurons in at least one output feature map based on the received bias values.

The bias interface, similar to the kernel interface is configured to address the memory in order to receive and particularly process the bias values.

The bias module is particularly not connected to the memory mapper. Thus, the bias memory provides bias values to the neuron module, and particularly to at least one output feature map independent of the information comprised in an incoming spike event.

According to another embodiment of the invention the neuron module s configured to receive a neuron address and a kernel value, and particularly a bias value, particularly from the kernel module and/or the bias module, and particularly to distribute the neuron address, the kernel value and the bias value to one of the neuron sub-interfaces, to read a neuron state of the received neuron address, particularly from the associated neuron memory, to update the read neuron state with the received kernel value and/or particularly with the received bias value, particularly on the neuron sub-interface, to compare the updated neuron state with at least one threshold value, particularly stored in and accessible from a threshold register, particularly wherein the register is programmable with the at least one threshold value, upon reaching the at least one threshold value, to generate a spike event that is particularly provided to the destination mapper, particularly via the merger module, and to reset the updated neuron state to a reset neuron state, to write the updated, i.e. particularly the reset neuron state to the received neuron address of the associated neuron memory.

The sCNN can comprise for example two threshold values for each neuron, a lower and an upper threshold value.

When a spike event is generated by the neuron, said neuron state is set to a reset neuron state. The reset neuron state can be for example zero or equal to a difference between the updated neuron state and the threshold.

Thus, the neuron module, particularly the neuron sub-interfaces are configured to perform the calculations necessary to update the neuron states of the neurons to which an incoming spike event projects to with the applicable kernel values particularly in a parallel fashion. The neuron module therefore comprises the necessary electronic circuits to perform such a task.

According to another embodiment of the invention, the neuron module comprises a plurality of neuron sub-interfaces with the associated neuron memories for parallel accessing the determined neuron addresses, wherein the neuron module is configured to distribute a plurality of received neuron addresses particularly by means of the neuron router module to the plurality of neuron sub-interfaces, wherein each neuron sub-interface in connection with its associated memory sub-block is configured to process received neuron addresses and kernel values.

This embodiment allows for the parallel processing of the neurons that are to be updated with the kernel values.

As particularly the reading and writing from the associated neuron memory is a comparable slow process, when for example a conventional memory storage such as a random-access memory is used, the processing time is reduced by parallelizing this step.

This embodiment particularly allows for a real-time processing of incoming spike events, even at high data rates.

According to another embodiment of the invention, the kernel interface comprises a plurality of kernel read/write interfaces for parallel accessing kernel memory sub-blocks comprised in the associated kernel memory, wherein the kernel interface is configured to distribute received kernel addresses particularly by means of a kernel interface router system to the plurality of kernel read/write interfaces and to collect kernel values received from the kernel memory sub-blocks.

This embodiment solves the problem of accelerating comparable slow read and write processes in conventional memory storages, such that the sCNN is particularly capable of real-time processing, even at high data rates.

The term “real-time” processing or operation is particularly characterized in that the average processing rate of incoming spike events by the sCNN is equal to the average rate of incoming spike events in the SCNN, such that a memory overflow is avoided.

According to another embodiment of the invention, the memory mapper is configured to execute the following sequence of operations in order to determine the kernel addresses of the applicable kernel values and the neuron coordinates with the corresponding neuron addresses to be updated, when a spike event is received by the memory mapper, the spike event comprising or consisting of an information about a coordinate (x, y) of the spike event in a source feature map, and particularly a channel identifier (c), the neuron coordinate particularly comprising an x-identifier and y-identifier:

particularly zero padding $(x+p_x, y+p_y)$ the coordinate (x,y) of the spike event with a predefined offset $(p_x, p_y)$ provided by and stored in a register, from the coordinate (x,y), particularly from the zero-padded coordinate $(x+p_x, y+p_y)$, computing a neuron anchor coordinate $(x_0, y_0)$ to which the spike event projects to, and a corresponding kernel anchor coordinate $(x_0^k, y_0^k)$ of the at least one kernel (f), wherein the kernel anchor coordinate $(x_0^k, y_0^k)$ is indicative of a kernel coordinate $(f, x_0^k, y_0^k)$ for each of the at least one kernel (f), particularly wherein the neuron anchor coordinate is associated to an output feature map, starting from the neuron anchor coordinate and the kernel anchor coordinate, determining all neuron coordinates (f, x, y) that are to be updated and all kernel coordinates $(c, f, x^k, y^k)$ of the applicable kernel values particularly by processing information on an output feature map size (H,W), a stride size $(s_x, s_y)$ and/or a kernel size $(H_k, W_k)$ that are provided by a register, determining from the determined neuron coordinates (f,x, y) and the kernel coordinates with the applicable kernel values particularly compressed neuron addresses and kernel addresses, providing the determined neuron and kernel addresses to the kernel module and/or the neuron module.

The source feature map is particularly an output feature map of a layer of the sCNN from which the spike event has been received.

Padding the coordinate from the incoming spike event particularly solves the problem of convolving spike events at a border of the feature map. The offset $(p_x, p_y)$ is particularly comprised in a programmable register.

A register in the context of the current specification particularly refers to a memory device that in comparison to a memory such as the neuron memory or the kernel memory provides faster reading and writing of the stored data. Thus, the sCNN according to the invention comprises registers particularly for storing information that is accessed frequently.

The offset values are accessed each time a spike event is received by the layer. Therefore, the offset is stored in a register that is electronically connected to or comprised by the memory mapper.

The neuron anchor coordinate addresses for example a neuron located at a corner of a projection window to which the spike event projects in the output feature map. A projection window is particularly given by a kernel size, e.g. its dimensions in x and y, a stride size for convolution and potentially other factors. The neuron anchor coordinate particularly serves the purpose of defining a starting point in the output feature map for convolution, particularly for a sweep operation that sweeps the kernel over the determined neuron addresses for updating the neuron states of these neurons. The sweeping of the kernel over the output feature map particularly depends on the stride size of the convolution.

The kernel anchor coordinate is particularly a coordinate of a kernel value that is located in a corner or close to a corner of the kernel. The kernel anchor coordinate serves the purpose of defining a starting point for determining all applicable kernel values. This is particularly important for stride size larger than one.

The kernel anchor coordinate particularly depends on the stride size, the kernel size and potentially other factors.

Once the neuron anchor coordinate and the kernel anchor coordinate are determined, a starting point for computing the neurons that are affected by the convolution with the applicable kernel values is generated.

From the starting point defined by the neuron anchor coordinate and the kernel anchor coordinate, all neuron coordinates (f, x, y) that are to be updated, i.e. all neurons to which the spike event projects to, and all kernel coordinates $(c,f,x^k,y^k)$ of the applicable kernel values are determined particularly by processing information on an output feature map size (H,W), a stride size $(s_x, s_y)$ and/or a kernel size $(H_k, W_k)$ that are provided by a register.

The parameters needed for determining the neuron coordinates to be updated, are particularly stored in a register that provides fast read and write speeds as compared to conventional memory storages.

From the neuron coordinates that particularly refer to a location in an output feature map, neuron addresses are determined, the latter particularly referring to a memory address in the neuron memory.

Once the neuron addresses and the kernel addresses are determined by the memory mapper, these addresses are provided to the kernel module, particularly to the kernel interface, where the applicable kernel values are received and send to the neuron module, where the neuron states of the determined neurons are updated with the applicable kernel values.

The memory mapper is configured and arranged to perform all these operations. For this purpose, the memory mapper is particularly configured and arranged to execute a formula that computes the neuron addresses to be updated and the kernel addresses for the applicable kernel values. This formula is particularly hardwired in the memory mapper and not programmable. However, the values stored in the registers for providing e.g. the stride size, the kernel size etc. to the formula can be programmed and adjusted by programming the respective register with the appropriate value.

According to another embodiment of the invention, the associated neuron memory is organized such that all neuron states are stored in consecutive neuron addresses, particularly wherein the associated neuron memory has all neuron states stored in consecutive neuron addresses during operation, wherein the memory mapper is configured to generate for all neuron coordinates consecutive neuron addresses such as to generate compressed neuron addresses and wherein the memory mapper is configured to provide the compressed neuron addresses to the neuron module.

This embodiment allows a memory-space-efficient use of the associated neuron memory.

According to another embodiment of the invention, the associated kernel memory is organized such that all kernel values are stored in consecutive kernel addresses, particularly wherein the associated kernel memory has all kernel values stored in consecutive kernel addresses during operation, wherein the memory mapper is configured to generate for all kernel coordinates consecutive kernel addresses such as to generate compressed kernel addresses and wherein the memory mapper is configured to provide the compressed kernel addresses to the kernel module.

This embodiment allows a memory-space-efficient use of the associated kernel memory.

According to another embodiment of the invention, the event-driven spiking convolutional network comprises a plurality of layers that are connected with a spike event router that is configured to route an outgoing spike event received from a source layer to at least one destination layer, particularly wherein the router accesses the destination information associated to the outgoing spike event, wherein the destination layer can be the source layer.

This embodiment provides a sCNN with a plurality of layers that are electronically connected and organized by means of a spike event router. The spike event router can be programmable so as to allow for various sCNN configurations and routing options.

A dynamic vision sensor configured to generate event-driven spikes can serve as an input or a first source layer for the spike event router.

According to another embodiment of the invention, the event-driven convolutional neural network is configured and arranged for event driven, particularly asynchronous processing of spike events, wherein the sCNN is configured to receive asynchronous spike events and to process each spike event upon reception, particularly wherein the memory mapper is an event-driven, particularly asynchronous electronic circuit, particularly wherein the associated memory module is an event-driven, particularly asynchronous module, particularly wherein the kernel module is an event-driven, particularly asynchronous module, particularly wherein the destination mapper is an event-driven, particularly asynchronous electronic circuit.

According to another embodiment of the invention, the sCNN is configured to receive and process spike events from a dynamic vision sensor, particularly wherein the sCNN comprises a dynamic vision sensor.

The problem according to the invention is furthermore solved by a computer program. The computer program is particularly configured to operate the sCNN, more particularly the components of the sCNN according to the invention.

The terms and definitions as introduced in the context of the embodiments of the sCNN apply to the computer program as well.

The computer program comprises instructions which, when the computer program is executed on at least one component of the sCNN, such as the memory mapper, the neuron module, the kernel module, the destination mapper, and/or the spike event router, of the event-driven spiking convolutional network according to the invention, causes the respective component to execute the steps for which the component is configured and arranged to in order to particularly asynchronously process an incoming spike event.

The computer program is particularly providing the registers of the sCNN with the programmable register values.

According to another embodiment of the computer program, the computer program causes the memory mapper a) to receive the incoming particularly single spike event from a source layer of the network via an electronic connection, the incoming spike event comprising information on a coordinate of particularly a single neuron in the source layer, and in response to the received spike event b) to determine neuron coordinates and corresponding neuron addresses in the associated neuron memory of the neurons to which a convolution of the received incoming spike event with the at least one convolution kernel projects to, c) to determine kernel coordinates with corresponding kernel addresses of the kernel values applicable to the neuron states of the determined neuron addresses, wherein the neuron states of the determined neuron addresses are to be updated with the applicable kernel values, particularly from the at least one or from the plurality of convolution kernels, d) to provide the determined kernel addresses for the applicable kernel values and particularly the determined neuron addresses to the kernel module, particularly to the kernel interface.

According to another embodiment of the computer program, the computer program causes the neuron module a) to receive the determined neuron addresses and the applicable kernel values, particularly at one of the neuron sub-interface, b) to determine for each received neuron address an updated neuron state for the neuron based on the applicable kernel value, c) to output an outgoing spike event for updated neurons reaching, i.e. particularly exceeding or falling below at least one predefined threshold value, particularly after the neuron state has been updated.

According to another embodiment of the computer program, the computer program causes the destination mapper to dump an outgoing spike event and/or to generate an outgoing destination information of an outgoing spike event received from the neuron module and to associate said destination information to the outgoing spike event, particularly wherein the outgoing destination information comprises information on at least one destination layer to which the outgoing spike event is to be delivered, particularly wherein the destination information comprises an information on the output feature map in which the spike event was generated, a neuron coordinate of the spike event in the output feature map, and/or an offset value with respect to a feature map index.

According to another embodiment of the computer program, the computer program causes the neuron sub-interface to receive a neuron address and a kernel value, and particularly a bias value, particularly from the kernel module and/or the bias module, to read a neuron state of the received neuron address, to update the read neuron state with the received kernel value and/or particularly with the received bias value, to compare the updated neuron state with at least one threshold value, particularly stored in and accessible from a threshold register, particularly wherein the register is programmable with the at least one threshold value, upon reaching the at least one threshold value, to generate a spike event that is particularly provided to the destination mapper, and to reset the updated neuron state to a reset neuron state, to write the updated, i.e. particularly the reset neuron state to the received neuron address of the associated neuron memory.

According to another embodiment of the computer program, the computer program causes the neuron module to distribute a plurality of received neuron addresses particularly by means of a neuron router module to the plurality of neuron sub-interfaces, wherein the computer program further causes each neuron sub-interface in connection with its associated memory to process received neuron addresses and kernel values.

According to another embodiment of the computer program, the computer program causes the kernel interface to distribute received kernel addresses particularly by means of a kernel interface router system to the plurality of kernel read/write interfaces and to collect kernel values received from the kernel memory sub-blocks.

According to another embodiment of the computer program, the computer program causes the memory mapper to execute the following sequence of operations in order to determine the kernel addresses of the applicable kernel values and the neuron coordinates with the corresponding neuron addresses to be updated, when a spike event is received by the memory mapper, the spike event comprising or consisting of an information about a coordinate (x,y) of the spike event in a source feature map, and particularly a channel identifier (c), the neuron coordinate particularly comprising an x-identifier and y-identifier:

particularly zero padding ($x+p_x$, $y+p_y$) the coordinate (x,y) of the spike event with a predefined offset ($p_x$, $p_y$) provided by and stored in a register, from the coordinate (x,y), particularly from the zero-padded coordinate ($x+p_x$, $y+p_y$), computing a neuron anchor coordinate ($x_0$, $y_0$) to which the spike event projects to, and a corresponding kernel anchor coordinate ($x_0^k$, $y_0^k$) of the at least one kernel (f), wherein the kernel anchor coordinate ($x_0^k$, $y_0^k$) is indicative of a kernel coordinate ($f, x_0^k, y_0^k$) for each of the at least one kernel (f), particularly wherein the neuron anchor coordinate is associated to an output feature map, starting from the neuron anchor coordinate and the kernel anchor coordinate, determining all neuron coordinates (f, x, y) that are to be updated, i.e. to which the spike event projects to, and all kernel coordinates ($c,f,x^k,y^k$) of the applicable kernel values particularly by processing information on an output feature map size (H,W), a stride size ($s_x$, $s_y$) and/or a kernel size ($H_k$, $W_k$) that are provided by a register, determining from the determined neuron coordinates (f,x, y) and the kernel coordinates with the applicable kernel values particularly compressed neuron addresses and kernel addresses, providing the determined neuron and kernel addresses to the kernel module and/or the neuron module.

According to another embodiment of the computer program, the computer program organizes the associated neuron memory such that all neuron states are stored in consecutive neuron addresses, wherein the computer program causes the memory mapper to generate for all neuron coordinates consecutive neuron addresses such as to generate compressed neuron addresses and wherein the computer program further causes the memory mapper to provide the compressed neuron addresses to the neuron module.

According to another embodiment of the computer program, the computer program organizes the associated kernel memory such that all kernel values are stored in consecutive kernel addresses, wherein the computer program causes the memory mapper to generate for all kernel coordinates consecutive kernel addresses such as to generate compressed kernel addresses and wherein the computer program further causes the memory mapper to provide the compressed kernel addresses to the kernel module.

According to another embodiment of the computer program, the computer program causes the spike event router to route an outgoing spike event received from a source layer to at least one destination layer, particularly wherein the router accesses the destination information associated to the outgoing spike event, wherein the destination layer can be the source layer.

The problem according to the invention is furthermore solved by a computer-implemented method. The computer-implemented method is particularly configured to operate the sCNN, more particularly the components of the sCNN according to the invention. The computer-implemented method furthermore particularly comprises the at least some features and/or method steps as disclosed for the computer program.

The problem is furthermore solved by a memory mapper for an event driven sCNN.

The terms and definitions as introduced in the context of the embodiments of the sCNN apply to the memory mapper as well.

The memory mapper according to the invention is configured to determine kernel addresses and neuron addresses to be updated in an event-driven fashion, when a spike event is received by the memory mapper, the spike event comprising or consisting of an information about a coordinate (x,y) and particularly a channel identifier (c) of the spike event, the coordinate particularly comprising an x- and y-identifier, wherein when a spike event is received by the memory mapper, the memory mapper executes the following sequence of operations:

- particularly zero padding ($x+p_x$, $y+p_y$) the coordinate (x,y) of the spike event with a predefined offset ($p_x$, $p_y$) provided by and stored in a register,
- from the coordinate (x,y), particularly from the zero-padded coordinate ($x+p_x$, $y+p_y$), computing a neuron anchor coordinate ($x_0$, $y_0$) to which the spike event projects to, and a corresponding kernel anchor coordinate ($x_0^k$, $y_0^k$) of the at least one kernel (f), wherein the kernel anchor coordinate ($x_0^k$, $y_0^k$) is indicative of a kernel coordinate (f, $x_0^k$, $y_0^k$) for each of the at least one kernel (f), particularly wherein the neuron anchor coordinate is associated to an output feature map,
- starting from the neuron anchor coordinate and the kernel anchor coordinate, determining all neuron coordinates (f, x, y) that are to be updated (i.e. the spike event projects to) and all kernel coordinates (c, f, $x^k$, $y^k$) of the applicable kernel values particularly by processing information on an output feature map size (H,W), a stride size ($s_x$, $s_y$) and/or a kernel size ($H_k$, $W_k$) that are provided by a register,
- determining from the determined neuron coordinates (f,x, y) and the kernel coordinates with the applicable kernel values particularly compressed neuron addresses and kernel addresses,
- providing the determined neuron and kernel addresses to a kernel module and/or a neuron module for processing the neuron and kernel addresses.

According to another embodiment of the memory mapper, the memory mapper is configured to generate for all neuron coordinates consecutive neuron addresses such as to generate compressed neuron addresses and wherein the memory mapper is configured to provide the compressed neuron addresses to a neuron module.

According to another embodiment of the memory mapper, the memory mapper is configured to generate for all kernel coordinates consecutive kernel addresses such as to generate compressed kernel addresses and wherein the memory mapper is configured to provide the compressed kernel addresses to a kernel module.

Particularly, exemplary embodiments are described below in conjunction with the Figures. The Figures are appended to the claims and are accompanied by text explaining individual features of the shown embodiments and aspects of the present invention. Each individual feature shown in the Figures and/or mentioned in said text of the Figures may be incorporated (also in an isolated fashion) into a claim relating to the device according to the present invention.

It is shown in

Figure 2:
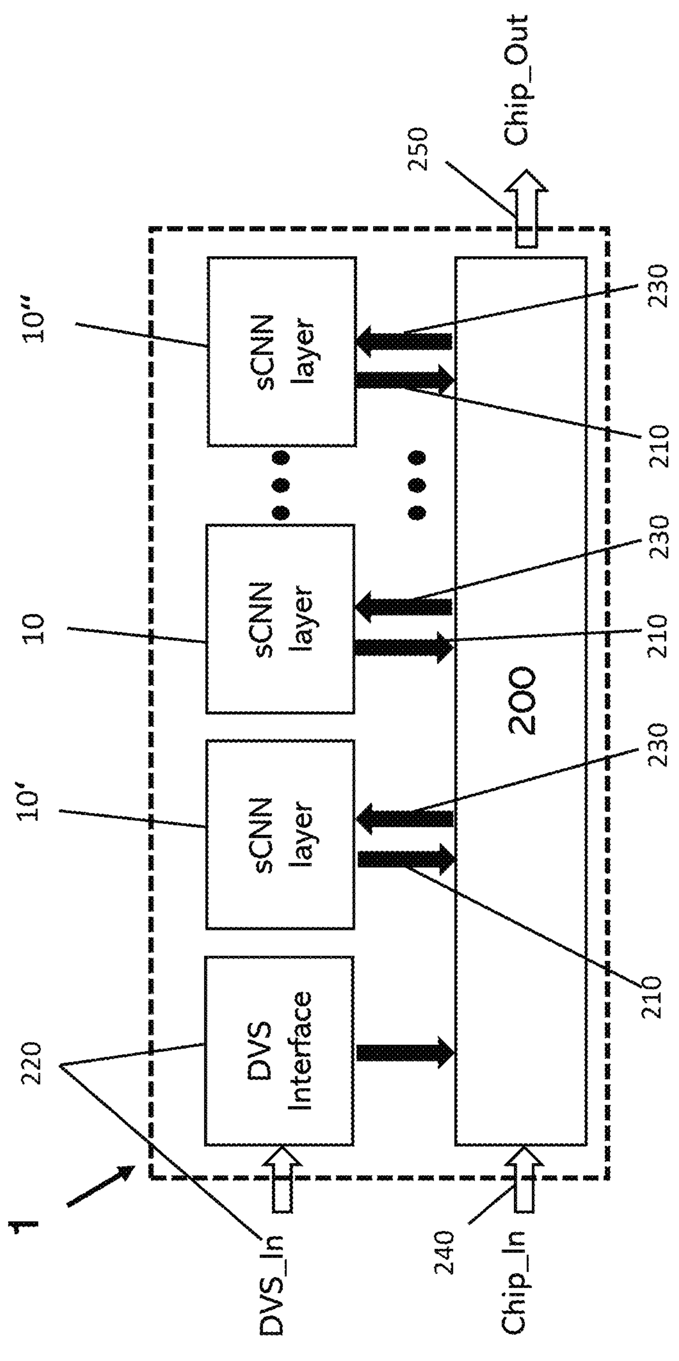
Figure 3:
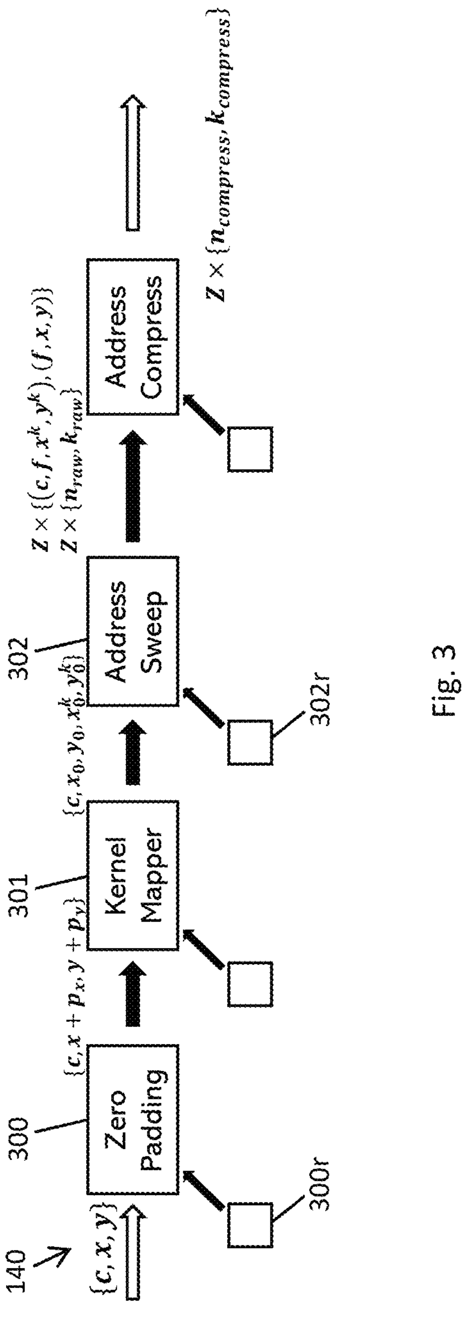
Figure 4:
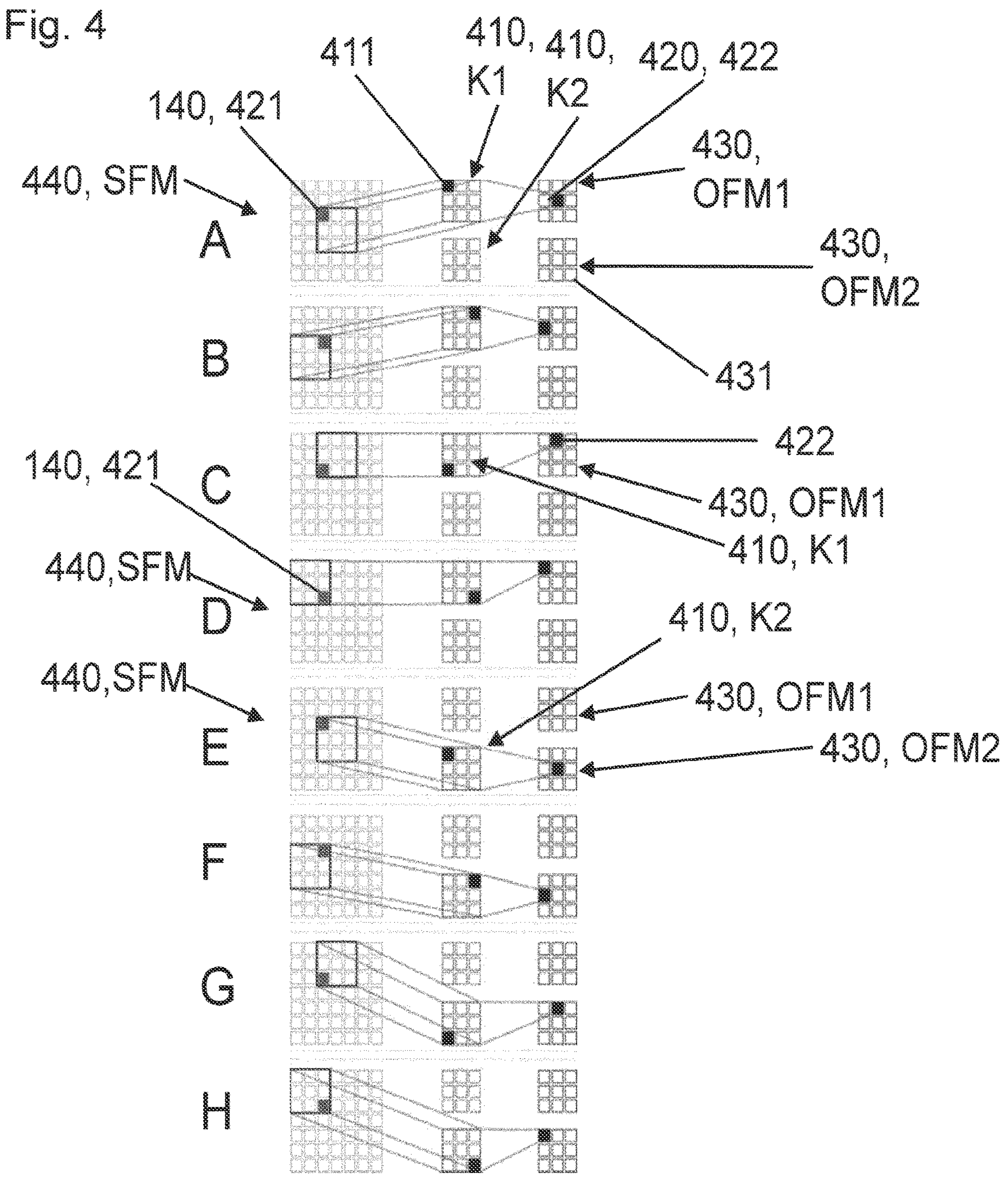
Figure 5:
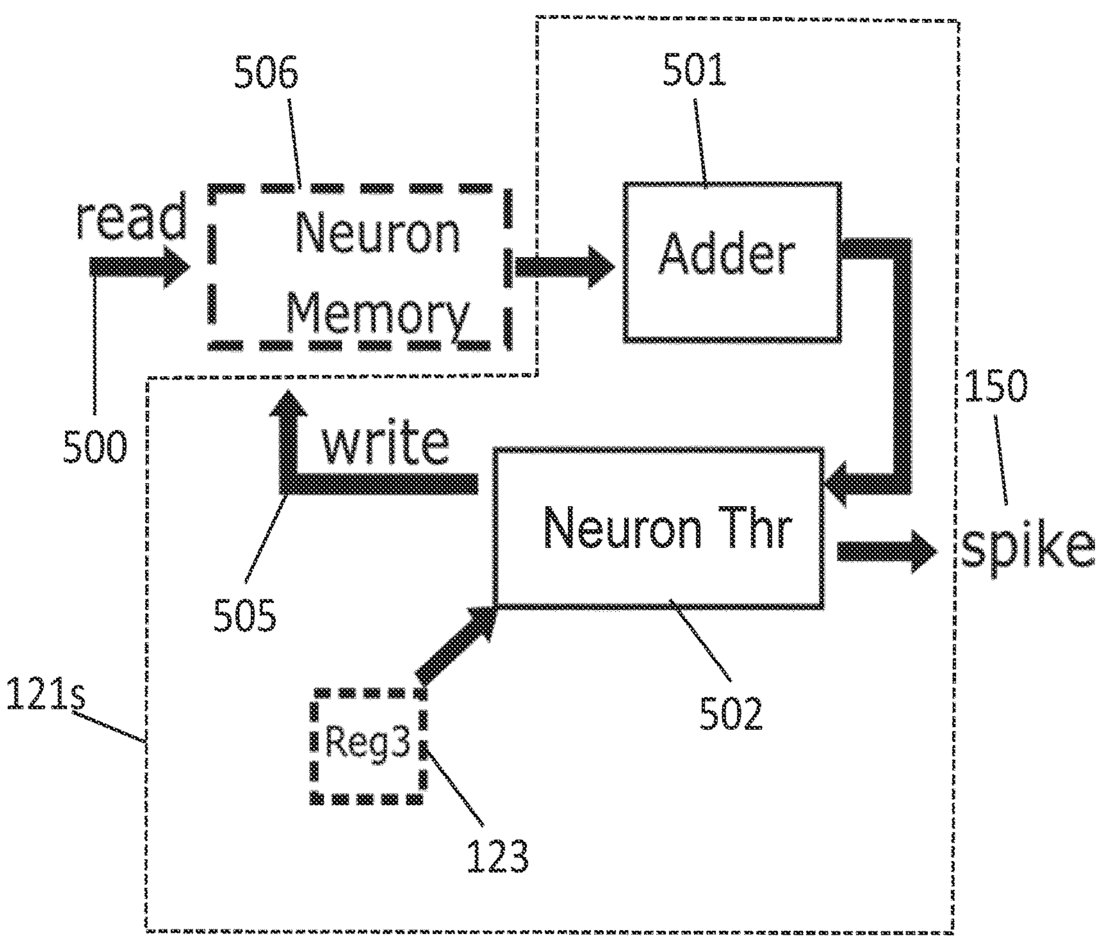
Figure 6:
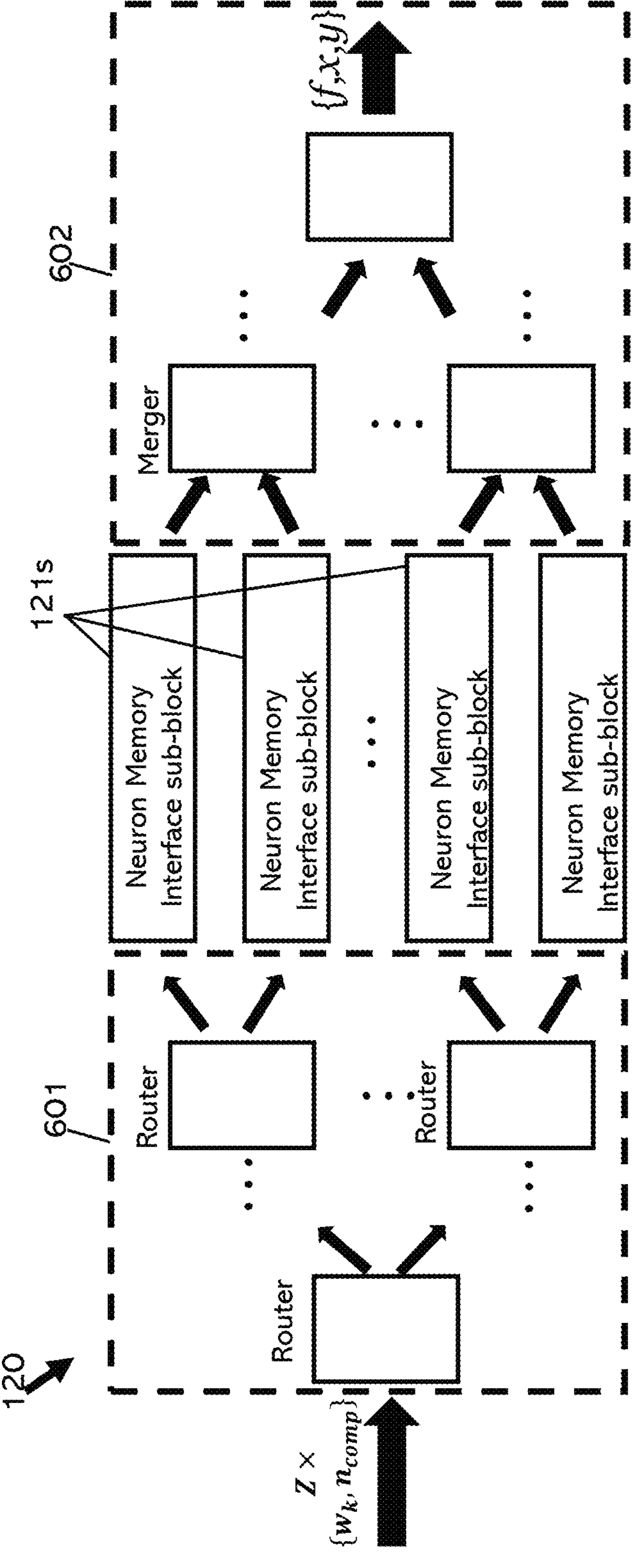

FIG. 1 a schematic layout of one layer of the sCNN according to the invention;

FIG. 2 a schematic layout of the sCNN comprising a plurality of layers;

FIG. 3 a schematic data flow diagram of the memory mapper;

FIG. 4 a schematic illustration as to how the neuron coordinates and applicable kernel values are determined;

FIG. 5 a schematic data flow diagram illustrating a neuron update process; and FIG. 6 a parallelized neuron module architecture.

FIG. 1 shows a schematic diagram of one layer 10 of the sCNN 1 according to the invention. The layer 10 is an electronic module comprising various components and is typically integrated with several copies in the sCNN.

Boxed regions refer to a unit or a module, wherein arrows indicate an electronic data connection and an associated data flow direction between the components.

The sCNN 1 comprises a memory mapper 130 configured to receive an incoming spike event 140 indicated by {c, x, y}. The incoming spike event 140 is particularly digital data comprising information about a location at which the incoming spike event 140 has been generated, and a channel index indicative of a channel to which the spike event 140 is associated. The location information is particularly in form of a coordinate in an output feature map of a source layer or a coordinate of a dynamic vision sensor (cf. FIG. 2), with an x and y identifier. The channel can for example be indicative of a color channel from a spike-event generating device such as a dynamic vision sensor. But other channel markers are possible.

The memory mapper's task is to determine all necessary information such that the (current) layer 10 performs its convolution(s). The memory mapper 130 therefore needs to determine the neuron addresses **142*n* to which an incoming spike event 140 projects to, i.e. which neurons in the layer are affected by a convolution of the spike event 140 with at least one convolution kernel 410**.

Once, a spike event 140 is received by the memory mapper 130, the memory mapper 130 starts processing this spike event 140. The memory mapper 130 is an event-driven memory mapper 130 and comprises for example a processing pipeline with multiple buffer stages and electronic combinatorial logistic circuits to add, multiply and multiplex the various bits of the spike event c, x, and y.

The memory mapper 130 is wired to execute a predefined formula that is configured to determine the neuron addresses **142*n* that are to be updated by the applicable kernel values 142*k*. As dimensions of a feature map from which the incoming spike event 140 is coming from, dimensions and number of the output feature maps in the current layer 10, the number of kernels, the stride size for convolution and other parameters might vary, the formula is provided with these values by a connected register or a register 131 comprised by the memory mapper 130. All registers 131, 163, 123 shown in FIG. 1** are comparably fast memory storages that are configured for fast read and write operations.

Note, that throughout the current specification all registers are programmable, and particularly configured to store non-trainable or non-trained parameters for the sCNN.

In turn, the kernel values **142*k* as well as the bias values are typically determined during a training procedure of the sCNN 1** as is well known in the art.

The register 131 connected to the memory mapper 130 stores the values for the kernel size of the at least one kernel, a stride, a zero-padding for x and y, the number of kernels f, and the number of output feature maps 430.

In addition, the register 131 might store values of the size of the output feature maps 430, for example their height and width (for example measured in units of pixels).

An exemplary embodiment of the memory mapper 130 and how neuron addresses and kernel values are determined by the memory mapper is shown FIG. 3.

The determined neuron addresses $n_{comp}$ and kernel addresses $k_{comp}$ are particularly compressed, such that no memory space of the associated neuron and kernel memories is wasted.

The memory mapper 130 outputs the neuron 142*n* and kernel addresses to the kernel module 110 comprising the kernel interface 111 and the associated kernel memory 112. The kernel interface 111 is a kernel memory interface.

At the kernel interface 111, the kernel addresses are received and the kernel interface 111 reads the kernel addresses from the associated kernel memory 112.

The kernel memory 112 is a conventional memory such as a random access memory (RAM), a flash memory or the like. The associated kernel memory 112 can be arranged on the same circuit board as the rest of the layer 10 or it can be connected to the layer 10 and constitute an external memory device.

As per spike event 140 a plurality of kernel values 142*k* have to be read from the kernel memory 112 and because conventional memory devices such as SRAM are comparably slow, the kernel module 110 is configured and arranged for parallel reading and writing kernel values 142*k* from and to the associated kernel memory 112 (cf. FIG. 6).

An exemplary embodiment that addresses this issue by parallelizing the read and write operations for the associated kernel and/or the associated neuron memory 112, 122 is shown in FIG. 6.

Supposing that the number of convolution kernels is N in the current layer 10, the kernel interface 111 outputs kernel weights of N convolution kernels associated to neuron addresses that are to be updated with the values of the N convolution kernels.

As each convolution kernel 410 (numbering refers to FIG. 4) projects to an associated output feature map 430, N convolution kernels 410 project to N output feature maps 430 in the current layer 10, assuming the dimensions of the kernel to be N×M×H×W, where M is the number of input channels, H is the height and W is the width of each kernel. Each output feature map 430 therefore comprises some neurons 420 that are to be updated with the applicable kernel values ($w_k$). The neuron addresses for these neurons 420 are provided by the kernel interface 111 in an output data set comprising said neuron addresses 142*n* associated to the applicable kernel values 142*k*. The neuron addresses of the neuron that are to be updated, while being provided by the kernel interface 111, are computed by the memory mapper 130 as laid out above.

The kernel module 110 is electronically connected to a neuron module 120 configured and arranged to process the neuron states of the neurons. The output data set from the kernel module 110 is received by the neuron module 120. When the neuron module 120 receives the output data set it starts processing said data set that is, the neuron module 120 is event-driven.

In addition to the update of some neurons 420 in the output feature maps 430, all neurons 431 in an output feature map 430 can be updated in repeated time intervals with bias values 142*b*.

For this purpose, each layer 10, 10', 10" comprises a bias module 160 with a bias interface 161 and an associated bias memory 162. The associated bias memory 162 is a conventional memory device and is configured to store bias values that are to be applied to the neurons 431.

The bias interface 161 is connected to or integrated in the bias associated memory 162 and configured to read and write bias values from the associated bias memory 162. Moreover, the bias interface 161 is configured to output the bias values and provide the bias values to the neuron module 120 together with the neuron addresses to be updated with the bias values.

It is important to note that the bias values 142*b* typically extend to all neurons 431 in a specific output feature map 430, while the neurons 420 that are to be updated with kernel values 142*k* depend on the specific spike event 140 that has been received by the memory mapper 130.

Therefore, the bias module 160 is not connected to the memory mapper 130 so as to exchange data and/or to operate synchronously, so as to operate independently to the input events and in parallel to any events being processed. The operation of the bias module can be based by a clocking device, but can also operate by any trigger of user's choice.

The bias module 160 comprises a bias register 163, i.e. a fast read/write memory component that stores an output feature map index indicative for the output feature maps 430 in the current layer 10 that are to be updated with the bias values 142*b*.

The neuron module 120 is connected to the bias module 160 and to the kernel module 110 and configured to receive the outputs from said modules 160, 110.

The neuron module 120 is connected to a neuron register 123. The neuron module 120 comprises a plurality of neuron sub-interfaces 121*s*, wherein each neuron sub-interface 121*s* has an associated neuron memory 506 (cf. FIG. 5) that stores the neuron states of the neurons (cf. FIG. 6) for reading, processing and writing the neuron states. One embodiment for the neuron sub-interface is shown in FIG. 5.

Every time the neuron module 120 receives an output data set from the kernel module 110 or bias values 142*b* from the bias module 160, the neuron module distributes said an output data set to one or more neuron sub-interfaces 601 that read the neuron states from the neurons that are to be updated with the applicable kernel values 142*k* and/or the bias values 142*b*.

As per spike event 140 or received bias value 142*b*, a plurality of neuron states has to be read from the associated neuron memory 506 and because conventional memory devices such as SRAM are comparably slow, the neuron module 120 is configured and arranged for parallel reading and writing neuron states from and to the associated neuron memory 506 (cf. FIG. 6) by means of the parallelized neuron sub-interfaces 121*s* and their associated neuron memories 506.

The neuron states are updated with the kernel values 142*k* for example according to the formula:

$$s(n+1)=\mathrm{mod}(s(n)+wb,tr)$$

wherein s(n) represents the neuron state of a neuron that is stored in the associated neuron memory 506, wb corresponds to either the applicable kernel value 142*k* or the bias value 142*b*. The new neuron state s(n+1) is given for example by the modulo operation of with an upper and a lower threshold tr.

In case the s(n)+wb exceeds the threshold, the neuron state is reset to a reset neuron state by means of said module operation and an outgoing spike event 150, is generated by the neuron sub-interface 121*s*. The neuron sub-interface 121*s* stores the new neuron state in the associated neuron memory 506 under the same neuron address from which it was received. This process is also illustrated and detailed in FIG. 5. Note that FIG. 5 provides a functional view for the neuron module 120, while FIG. 6 provides a schematic view of the structural organization of the neuron module 120.

Other ways of defining the reset neuron state are possible and are elaborated in the context of FIG. 5.

For all neurons that have reached either the lower or the upper threshold 502 the neuron interface 601 outputs an outgoing spike event 150. This outgoing spike event 150 is a data structure that comprises the coordinate of the neuron in the output feature map that comprises said neuron and furthermore an output feature map index for indicating the output feature map. This data structure is electronically transmitted to a destination mapper 170 (cf. FIG. 1) component also referred to as destination mapper in the context of the current specification.

The destination mapper is for example a merge buffer for merging information received from a register 171 connected to the destination mapper and the outgoing spike event 150.

The destination mapper 170 is configured and arranged to append the information of an outgoing spike event 150, 503 such that it can be routed to the appropriate layer 10,10',10" also referred to as the destination layer in the context of the current specification.

For this purpose, the destination mapper 170 comprises an associated register 171 that provides information about the destination layers 10, 10', 10" to which the outgoing spike event 150, 503 is to be routed.

The destination mapper 170 appends the information of the outgoing spike event 150, such that it contains the x, y and index of the coordinate of the output feature map 430 in which the spiking neuron is located. Furthermore, the output feature map index is comprised in said appended information indicating the output feature map in which the spiking neuron is located. Moreover, the outgoing spike event 150 can be routed to a plurality of destination layers 10', 10". Therefore, the destination mapper 170 appends the information such that it contains a destination layer index indicative of another layer 10', 10" comprised by the sCNN 1 and an offset value with respect to a feature map index such that the outgoing spike event is mapped to a predefined output feature map in the destination layer. The appending of an offset value allows for layer stacking in the sCNN 1.

An outgoing spike event 150, having the information appended as laid out before, can then be provided to a spike event router 200 of the sCNN as depicted in FIG. 2.

FIG. 2 shows a general layout of the sCNN 1 according to the invention, comprising a spike event router 200 and a plurality of layers 10, 10', 10" (as described in FIG. 1).

The spike event router 200 receives a spike event 210 from a layer 10, 10', 10" or from an event generating device 220 such as a dynamic vision sensor.

The spike event router 200 then provides 230 such a spike event 210 based on its appended information of the destination layer 10', 10" for further processing the spike event 210.

The spike event router 200 is for example a stream multiplexer/demultiplexer circuit.

The spike event router 200 is programmable and configured to route spike events in a backward, forward or recurrent manner to the destination layer providing the sCNN 1 with a high degree of flexibility, particularly with respect to the requirements of deep learning networks.

The spike-event router 200 is configured to provide layer-to layer data flow as well as for chip-to-chip communication (indicated as "chip-out" and "chip in"), in case multiple sCNNs 1 are cooperatively arranged as a network.

For this purpose, the spike event router 200 comprises an input port 240 for receiving signals and data from an external device (which can be a spike event router from a second sCNN) chip-to-chip. The spike event router 200 is also configured to receive data, i.e. spike events generated by a dynamic vision sensor 220 connected to the spike event router 200. The dynamic vision sensor 220 can be treated as a source layer of the sCNN 1, except no recurring or backward propagation is allowed.

The spike event router 200 has an output port 250 for outputting spike events to another chip or as a result.

The sCNN 1 particularly comprises more than 100.000 neurons that can be programmable assigned to the layers 10,10',10" and output feature maps 430 of the sCNN 1.

The layers 10,10',10" particularly the registers 131, 163, 123, 171 of the layers 10, 10', 10" are programmed accordingly in order to reflect the specific layout of each layer 10, 10',10", i.e. how many convolution kernels are comprised in each layer, the output feature map dimensions of each layer etc.

A dynamic vision sensor 220 is for example a device with light receptive pixels that are arranged in an array. Each pixel is configured to output a spike event, in case a detected light intensity has changed. That is the pixels of a dynamic vision sensor 220 are sensitive to changes in detected light flux.

The dynamic vision sensor 220 is an event-driven device, i.e. the pixels output the spike events when they occur unlike a frame-based camera read out. Such dynamic vision sensors provide the advantage of very fast dynamic imaging. Coupled with an sCNN 1 according to the invention the full potential of real-time, ultra-fast data processing can be exploited with the sCNN 1.

In FIG. 3 the data flow in the memory mapper 130 is schematically shown. The purpose of the memory mapper 130 is to determine the neurons 420 to which an incoming spike event 140 projects. This is also shown in FIG. 4

An incoming spike event 140 is processed as follows by the memory mapper 130:

The incoming spike event 140 carries for example the information of a channel and a coordinate {c, x, y}. First, a zero padding 300 of the received incoming spike event 140 is performed, wherein the coordinates of the spike event 140 are translated by an offset value $p_x$, $p_y$:

$$\{c,x,y\} \rightarrow \{c,x+p_x,y+p_y\}.$$

The zero padding 300 serves the purpose of avoiding edge effects when the coordinates are too close to a border of the feature map 430.

The offset values are provided by the register 300*r*, 131 associated to the memory mapper 130.

In a next step the kernel addresses for the applicable kernel values of the at least one kernel are determined, by a module referred to a kernel mapper 301. The kernel mapper 301 is configured to compute a neuron anchor coordinate for each feature map 430 to which the incoming spike event 140 projects to.

The neuron anchor coordinate is for example given by neuron located in a bottom right corner of an array in the respective output feature map 430 to which the event projects to. This step involves the processing of the output feature map size, the convolution kernel size as well as a stride of convolution. Moreover, a corresponding kernel anchor coordinate is calculated that corresponds to the said neuron anchor coordinate. The neuron anchor coordinate and the kernel anchor coordinate serve as a starting point for determining all neurons 420 in the output feature map 430 that are to be updated and all applicable kernel values **142*k* that need to be received from the kernel memory 112**.

Obviously, the starting point based on the two anchor coordinates does not need to be the neuron coordinate for the neuron located in the bottom right corner but can be any neuron, as long as its relationship to the projection of the spike event is known.

The neuron anchor coordinate and the kernel anchor coordinate are then sent to the address sweep module 302 that is configured to compute the remaining neuron coordinates of the neurons 420 to which the spike event 140 projects to and their associated neuron addresses **142*n***.

Moreover, all kernel addresses for the applicable kernel values **142*k* are determined by the sweep module 302**.

The computation for the neuron coordinates 422 and the applicable kernel coordinates 411 is done by "sweeping", i.e. shifting the convolution kernel 410 according to the stride size, and the determined anchor coordinates over the output feature map 430 as for example shown in FIG. 4.

From the neuron coordinates 422 and the kernel coordinates 411, the neuron addresses **142*n* and kernel addresses are determined by the sweep module 302. For this purpose, the sweep module might access a programmable register 302*r***.

The neuron addresses and the kernel addresses are compressed as laid out above, such that memory space is optimally preserved in the neuron memory 506 and the kernel memory 112.

The compressed neuron and kernel addresses are then provided from the memory mapper 130 to the kernel module 110 as explained above.

In FIG. 4 the procedure of determining the neuron addresses to which an incoming spike event 140 projects to and the applicable kernel values **142*k*** is schematically illustrated.

The spike event 140 comes from a source feature map 440, particularly from an output feature map 430 in the source layer, which is depicted on the left column of FIG. 4. Each square in the left column indicates a neuron with an associated coordinate {x, y} in the source layers feature map 440, SFM, wherein the neuron 421 from which the spike event 140 originated is colored black. Turning for example to panel A of FIG. 4, the current layer 10 at which the spike event 140 is received comprises two kernels 410 K1, K2, each having a kernel size ($H_k$, $W_k$) of 3×3 kernel values (depicted as a matrix having 3×3 squares). Therefore, the current layer 10 also comprises two output feature maps 430 OFM1, OFM2. In this example the output feature maps OFM1, OFM2 have a size (H, W) of 3×3 neurons each (each neuron being depicted as a square). The panels B to H of FIG. 4 depict the same situation just at different processing steps of the convolution.

The stride $s_x = s_x$ is set to two in x and y direction, i.e. the convolution kernels K1, K2 are shifted in steps of two over the output feature map OFM1 and OFM2.

The neuron anchor coordinate $x_0$, $y_0$ and the corresponding kernel anchor coordinate for the first kernel K1 are determined such that the neuron anchor coordinate $x_0$, $y_0$ is located in the bottom right corner of a projection portion to which the spike event 140/421) projects to, as can be seen from FIG. 4 panel A. Subsequently, the sweep module "sweeps" the first convolution kernel K1 according to the stride size $s_x$ over the output feature map OFM1, as shown in FIG. 4 panel B and determines another kernel coordinate and another neuron coordinate to which the spike event 140 (indicated as the neuron 421) projects to. The sweep is indicated by the boxed region comprising nine neurons (and always the neuron 421) in the source feature map 440 SFM.

In the next step (panel C) the first convolution kernel K1 is swept along the y direction (with stride 2) and again neuron coordinates 422 in the first output feature map OFM1 and kernel coordinates are determined.

In panel D of FIG. 4 the first convolution kernel K1 is shifted along x and the last of four neuron coordinates and kernel coordinates for the first output feature map OFM1 is determined.

The same procedure (compare panels G to H) is then performed for the second kernel K2. Such that in total eight neuron coordinates and eight kernel coordinates from two kernels K1, K2 in two output feature maps OFM1 and OFM2 are determined by the sweep module.

For the determined neuron coordinates 422 and the kernel coordinates 411 the corresponding (eight) neuron addresses **142*n* and (eight) kernel addresses with the applicable kernel values 142*k* are determined, such that the convolution can be executed by the neuron module 120**.

FIG. 5 shows in detail and schematically how the convolution is executed on the neuron module 120, particularly on a neuron sub-interface **121*s***.

When the neuron sub-interface receives a neuron address **142*n* and an applicable kernel value 142*k* for example from the neuron router module 601, the neuron sub-interface 121*s* reads 500 the neuron state that is stored under the received neuron address 142*n* from the associated neuron memory 506. The applicable kernel value 142*k* is added 501 to the neuron state. The resulting neuron state is then compared to at least one threshold value 502, usually two threshold values—a lower and an upper threshold value 502**.

In case the resulting neuron state exceeds one of the thresholds 502 (either rises above the upper threshold or falls below the lower threshold) an outgoing spike event 150 is generated by the neuron sub-interface **121*s*** and the neuron state is reset to a reset neuron state. In this example the reset neuron state can be either zero or a remainder of a modulo operation.

The reset neuron state is written back 505 to the associated neuron memory 506 of the neuron sub-interface **121*s*. In case no spike event is generated, the resulting neuron state is written 505 back to the associated neuron memory 506**.

The schematic of FIG. 5 applies in the same way to bias values **142*b* and corresponding neuron addresses received at the neuron sub-interface 121*s*, where instead of the applicable kernel value 142*k*, the bias value 142*b* is added to the neuron state. The rest of the processing is handled identically as has been described for the reception of a kernel value 142*k***.

FIG. 6 schematically shows a how parallel access and pipelined processing of the associated kernel 112, or neuron memory 506 is facilitated. In FIG. 6 it is shown that the neuron module 120 is configured to address a plurality of neuron sub-interfaces **121*s*, wherein each neuron sub-interface 121*s* is configured to read, write and process neuron addresses and neuron states as elaborated before. For this purpose, the neuron module 120 comprises a neuron router module 601 that is receives the applicable kernel values and the determined neuron addresses to be updated. The neuron module might also receive bias values for distribution to the determined neuron addresses. The router module 601 transmits the received kernel values and applicable neuron addresses to a corresponding neuron sub-interface 121*s* of the plurality of parallel organized neuron sub-interfaces 121***s*. At the neuron sub-interface 121*s* the applicable neuron address is read from the associated memory 506, updated with the kernel value 142*k* and particularly the bias value 142 (cf. FIG. 5). Once the neuron state of the determined neuron address is updated the updated neuron state is written back to, i.e. stored in the associated memory 506. Depending on the updated neuron state the neuron sub-interface might generate a spike event and outputs said spike event. As the neuron interface is configured to operate in parallel, the comparably slow reading and writing processes on the neuron memory are compensated such that processing speed is maintained. The neuron module further comprises a merger module 602 that merges the generated spike events form the plurality of neuron-sub-interfaces 121*s* for further processing in a common particularly serial connection. The neuron module 120, where each neuron sub-interface 121*s* has its own accessible associated memory 506 allows for effectively parallelized processing of reading, writing and updating of a plurality of neuron states such that the processing speed of the layer 10 is increased as compared to non-parallel processing.

A similar architecture might also be implemented for the kernel module 110, such that the reading and writing of kernel values at the kernel module is parallelized accordingly.

Accordingly, the kernel module 100 comprises a plurality of kernel sub-interfaces that each comprise an associated kernel memory for reading and writing kernel values. The plurality of kernel sub-interfaces is connected to a kernel router module configured for distributing a kernel addresses to the kernel sub-interfaces such that the kernel values associated to the kernel addresses are read form the associated kernel memory. Moreover, the kernel module may comprise a kernel merger module configured to funnel the kernel values provided form the plurality of kernel sub-interfaces to a serial bus.

The spiking convolutional neural network according to the invention provides dedicated electronic circuitry for operating modern spiking convolution neural networks in a memory and energy efficient fashion.

LIST OF REFERENCE SIGNS

1 event-driven spiking convolution neural network
10, 10', 10" layer
110 kernel module
111 kernel interface
112 kernel memory
120 neuron module
121*s* neuron sub-interface
123 register of neuron module
130 memory mapper
131 register of memory mapper
140 incoming spike event
141 kernel and neuron addresses
142*b* bias values
142*n* neuron address(es) to be updated
142*k* applicable kernel values
150 outgoing spike
160 bias module
161 bias interface
162 bias memory
163 register of bias module
170 destination mapper
171 register of destination mapper
200 event router
210 outgoing spike event
220 DVS sensor
230 ingoing spike event
240 input/chip-to-chip input port
250 output/chip-to-chip output port
300 zero padding module/operation
300*r* associated register
301 kernel mapping module/operation
302 address sweep module/operation
302*r* associated register
410 convolution kernel
411 kernel coordinate, also K1, K2
420 determined/updated neuron
421 neuron coordinate in source layer
422 neuron coordinate of determined neurons
430 output feature map also OFM1, OFM2
431 neuron in output feature map
440, SFM source feature map
500 read neuron state
501 update neuron state
502 threshold value
504 register for threshold value
505 write neuron state
601 neuron router module
602 neuron merger module

The invention claimed is:

1. An electronic circuit configured and arranged for operating an event-driven spiking convolutional neural network (1), comprising a plurality of layers, wherein each layer comprises:

a kernel module (110) configured to store and to process in an event-driven fashion kernel values of at least one convolution kernel (410), a neuron module (120) configured to store and to update in an event-driven fashion neuron states of neurons of the spiking convolutional neural network (1), and to output spike events (150) generated from updated neurons (420), a destination mapper (170) configured to generate outgoing destination information of an outgoing spike event (150) received from the neuron module (120) of the current layer and to append said destination information to the outgoing spike event (150), a memory mapper (130) configured to determine neurons (420) to which an incoming spike event (140) from a source layer projects by means of a convolution with at least one convolution kernel (410), and wherein neuron states of said determined neurons (420) are to be updated with applicable kernel values of at least one convolution kernel (410), wherein the memory mapper (130) is configured to process incoming spike events in an event-driven fashion.

2. The electronic circuit according to claim 1, wherein the kernel module (110) comprises a kernel interface (111) connected to an associated kernel memory (112), wherein the associated kernel memory (112) is configured to store the kernel values of the at least one convolution kernel (110) in kernel addresses, wherein the kernel module (110) is electronically connected to the neuron module (120).

3. The electronic circuit according to claim 2, wherein the associated kernel memory (112) is a memory that is physically arranged on each layer.

4. The electronic circuit according to claim 1, wherein the memory mapper (130) is electronically connected to the kernel module (110), wherein the memory mapper (113) is configured and arranged:

a) to receive the incoming spike event (140) from a source layer of the spiking neural network (1), the incoming spike event (140) comprising information on a neuron coordinate (421) in the source layer;

and in response to the received spike event (140), b) to determine neuron coordinates (422) and corresponding neuron addresses of the neurons (420) to which a convolution of the received spike event (140) with the at least one convolution kernel (110) projects, c) to determine kernel coordinates (411) addresses with corresponding kernel addresses coordinates (411) of the kernel values applicable to the neuron states of the determined neuron addresses, wherein the neuron states of the determined neuron addresses are to be updated with the applicable kernel values, d) to provide the determined neuron addresses to the kernel module.

5. The electronic circuit according to claim 4, wherein the kernel module (110) is configured and arranged to receive the determined kernel addresses and to provide the applicable kernel values stored at the determined kernel addresses, in conjunction with the determined neuron addresses, to the neuron module (120).

6. The electronic circuit according to claim 4, wherein the neuron module (120) is configured and arranged:

a) to receive the determined neuron addresses (142*n*) and the applicable kernel values (142*k*), b) to determine for each received neuron address (142*n*) an updated neuron state for the neuron (420) based on the applicable kernel value (142*k*), c) to output an outgoing spike event (150) for updated neurons (420) reaching at least one predefined threshold value (502).

7. The electronic circuit according to claim 4, wherein the memory mapper (130) is wired to execute a predefined formula that is configured to determine the neuron addresses that are to be updated by the applicable kernel values.

8. The electronic circuit according to claim 1, wherein the memory mapper (130) is configured to determine for each received spike event (140) at least one output feature map (430) consisting of neurons assigned to the output feature map (430), wherein the number of output feature maps (430) is equal to the number of convolution kernels (410) of the current layer (10).

9. The electronic circuit according to claim 1, wherein each layer (10, 10') further comprises a bias module (160) comprising an associated bias memory (162) and a bias interface (161) connected to the associated bias memory (162), wherein the associated bias memory (162) is configured to store bias values in bias addresses, wherein the bias module (160) is connected to the neuron module (120) and wherein the bias module (160) is configured to provide predefined time-intervals bias values to the neuron module (120), wherein the neuron module (120) is configured to update the neuron states of all neurons (431) in at least one output feature map (430) based on the received bias values.

10. The electronic circuit according to claim 9, wherein the bias module (160) comprises a bias register (161) that stores an output feature map index indicative for the output feature maps in the current layer that are to be updated with the bias values.

11. The electronic circuit according to claim 1, wherein the neuron module (120) comprises a plurality of parallel-operating neuron sub-interfaces (121*s*) that are configured to process received neuron addresses (142*n*) and kernel values (142*k*), and received bias values (142*b*) and to generate (501, 502) updated neuron states and spike events (150), wherein each neuron sub-interface (121*s*) has an associated neuron memory (506) for reading the neuron state for the received neuron address and to write the updated neuron state to the received neuron address in the associated neuron memory (506), such that a parallel processing of neuron state is achieved by the neuron sub-interfaces and their associated neuron memories (506).

12. The electronic circuit according to claim 11, wherein the neuron module (120) comprises a router module (601) configured and adapted to receive determined neuron addresses (142*n*) and kernel values (142*k*), and bias values (142*b*) from the kernel module (110) and/or a bias module (160), and to transmit the received neuron addresses (142*n*) and the kernel values (142*k*), and the bias values (142*b*) to the plurality of parallel-operating neuron sub-interfaces (121*s*) that are configured to process the received neuron addresses (142*n*) and kernel value (142*k*), and the bias values (142*b*) in parallel, wherein the neuron module (120) further comprises a merger module (602) configured and adapted to receive generated spike events (150) from the plurality of neuron sub-interfaces (121*s*) and funnel the spike events for serial processing in a bus having less channels than neuron sub-interfaces, wherein the bus has a single transmission channel only.

13. The electronic circuit according to claim 11, wherein the associated neuron memory (506) is organized such that all neuron states are stored in consecutive neuron addresses, wherein the memory mapper (130) is configured to generate for all neuron coordinates (f, x, y) in the consecutive neuron addresses such as to generate compressed neuron addresses and wherein the memory mapper (130) is configured to provide the compressed neuron addresses to the neuron module (120).

14. The electronic circuit according to claim 11, wherein each associated neuron memory (506) is a memory storage that is physically arranged on each layer or a memory that is allocated and connected to the layer but not comprised by the layer.

15. The electronic circuit according to claim 1, wherein the neuron module (120) is configured:

to receive a neuron address (142*n*) and a kernel value (142*k*), and a bias value (142*b*) from the kernel module (110) and/or the bias module (160) at the router module (601), to read (500) a neuron state of the received neuron address (142*n*) from the associated neuron memory (506) on one of the neuron sub-interfaces (121*s*), to update (501) the read neuron state with the received kernel value (142*k*) and/or with the received bias value (142*b*) on the neuron sub-interface (121*s*), to compare the updated neuron state with at least one threshold value (502) stored in and accessible from a threshold register (504) on the neuron sub-interface (121*s*), upon reaching the at least one threshold value (502), to generate a spike event (503) that is provided to a destination mapper (170), and to reset the updated neuron state to a reset neuron state, to write (505) the updated neuron state to the received neuron address (142*n*) of the associated neuron memory (506).

16. The electronic circuit according to claim 1, wherein the event-driven spiking convolutional network (1) comprises a plurality of layers (10, 10', 10") that are connected with a spike event router (200) that is configured to route an outgoing spike event received from a source layer to at least one destination layer, wherein the spike event router (200)

accesses the destination information associated to the outgoing spike event (150), wherein the destination layer (10") can be the source layer (10').

17. The electronic circuit according to claim 16, wherein the memory mapper (130) is configured to execute the following sequence of operations in order to determine the kernel addresses of the applicable kernel values (142*k*) and the neuron coordinates (421) with the corresponding neuron addresses (142*n*) to be updated, when a spike event (140) is received by the memory mapper (130), the spike event (140) comprising or consisting of an information about a coordinate (x,y) of a neuron (421) having generated the spike event (140) in a source feature map (440), and a channel identifier (c), the coordinate (x,y) comprising an x-identifier and y-identifier:

- zero padding ($x+p_x$, $y+p_y$) the coordinate (x,y) of the spike event (140) with a predefined offset ($p_x$, $p_y$) provided by and stored in a register,
- from the coordinate (x,y), from the zero-padded coordinate ($x+p_x$, $y+p_y$), computing a neuron anchor coordinate ($x_0$, $y_0$) to which the spike event projects, and a corresponding kernel anchor coordinate ($x_0^k$, $y_0^k$) of the at least one kernel (f), wherein the kernel anchor coordinate ($x_0^k$, $y_0^k$) is indicative of a kernel coordinate (f, $x_0^k$, $y_0^k$) for each of the at least one kernel (f), wherein the neuron anchor coordinate ($x_0$, $y_0$) is associated to an output feature map (430),
- starting from the neuron anchor coordinate and the kernel anchor coordinate, determining all neuron coordinates (f, x, y) that are to be updated and all kernel coordinates ($c,f,x^k,y^k$) of the applicable kernel values (142*k*) by processing information on an output feature map (430) size, a stride size and/or a kernel size that are provided by a register,
- determining from the determined all neuron coordinates (f,x,y) and the all kernel coordinates ($c,f,x^k,y^k$) of the applicable kernel values (142*k*) compressed neuron addresses and compressed kernel addresses,
- providing the determined compressed neuron addresses and compressed kernel addresses to the kernel module (110) and/or the neuron module (120).

18. The electronic circuit according to claim 17, wherein the neuron anchor coordinate ($x_0$, $y_0$) is given by a neuron located in the bottom right corner of an array in the respective output feature map (430) to which the event projects, and

- a corresponding kernel anchor coordinate ($x_0^k$, $y_0^k$) is calculated that corresponds to the neuron anchor coordinate ($x_0$, $y_0$), and
- the neuron anchor coordinate ($x_0$, $y_0$) and the kernel anchor coordinate ($x_0^k$, $y_0^k$) are then sent to an address sweep module (302) that is configured to compute the remaining neuron coordinates of the neurons (420) to which the incoming spike event (140) projects and their associated neuron addresses (142*n*).

19. The electronic circuit according to claim 1, wherein the layer refers to at least one electronic circuit that represents a layer in the spiking convolutional neural network, and the event-driven spiking convolutional neural network operates not frame-based or clock-based.

20. The electronic circuit according to claim 1, wherein the memory mapper (130), the neuron module (120) and the kernel module (110) have a hard-wired correspondence in the electronic circuit.

21. The electronic circuit according to claim 1, wherein the memory mapper (130) is an asynchronous electronic circuit.

22. The electronic circuit according to claim 1, wherein the memory mapper (130) is provided with programmable register values specifying the formula for said determination.

23. The electronic circuit according to claim 1, wherein the memory mapper (130) is an asynchronous serial interface circuit having a predefined bandwidth parallel interface such that at least one spike event can be processed at a time.

24. The electronic circuit according to claim 1, wherein the spiking convolutional neural network (1) is configured to receive asynchronous spike events and to process each spike event upon reception.

25. The electronic circuit according to claim 1, wherein the kernel module (110) is an asynchronous module and destination mapper (170) is an asynchronous electronic circuit.

26. The electronic circuit according to claim 1, wherein the plurality of layers that are electronically connected and organized by means of a spike event router which are programmable so as to allow for various spiking convolutional neural network configurations and routing options.

27. The electronic circuit according to claim 1, wherein the spiking convolutional neural network (1) is configured to receive and process spike events from a dynamic vision sensor, wherein the dynamic vision sensor configured to generate event-driven spikes can serve as an input or a first source layer for the spike event router.

28. The electronic circuit according to claim 1, wherein the memory mapper (130) starts processing the incoming spike event (140) once the incoming spike event (140) is received by the memory mapper (130), and the memory mapper (130) is event-driven and comprises a processing pipeline with multiple buffer stages and electronic combinatorial logistic circuits to add, multiply and multiplex various bits of the spike event c, x, and y, wherein the incoming spike event (140) comprises information about a coordinate (x, y) and a channel identifier (c).

29. The electronic circuit according to claim 1, wherein the registers of the layers are programmed in order to reflect the specific layout of each layer.

30. A memory mapper (130) equipment for an event-driven spiking convolutional neural network configured to determine kernel addresses and neuron addresses (142*n*) to be updated in an event-driven fashion, when a spike event (140) is received by the memory mapper (130), wherein the spike event (140) comprising or consisting of an information about a coordinate (x,y) and a channel identifier (c) of the spike event (140), the coordinate comprising an x-identifier and y-identifier, wherein when a spike event (140) is received by the memory mapper (130), the memory mapper (130) executes the following sequence of operations:

- zero padding ($x+p_x$, $y+p_y$) the coordinate (x,y) of the spike event (140) with a predefined offset ($p_x$, $p_y$) provided by and stored in a register (300*r*),
- from the coordinate (x,y), from the zero-padded coordinate ($x+p_x$, $y+p_y$), computing a neuron anchor coordinate ($x_0$, $y_0$) to which the spike event projects, and a corresponding kernel anchor coordinate ($x_0^k$, $y_0^k$) of the at least one kernel (f), wherein the kernel anchor coordinate ($x_0^k$, $y_0^k$) is indicative of a kernel coordinate (f, $x_0^k$, $y_0^k$) for each of the at least one kernel (f), wherein the neuron anchor coordinate ($x_0$, $y_0$) is associated to an output feature map (430),
- starting from the neuron anchor coordinate and the kernel anchor coordinate, determining all neuron coordinates (f, x, y) that are to be updated and all kernel coordinates ($c,f,x^k,y^k$) of the applicable kernel values (142*k*) by processing information on an output feature map (430) size, a stride size and/or a kernel size that are provided by a register, determining from the determined all neuron coordinates (f,x,y) and the all kernel coordinates ($c,f,x^k,y^k$) of the applicable kernel values (142$k$) compressed neuron addresses and compressed kernel addresses, providing the determined compressed neuron addresses and compressed kernel addresses to the kernel module (110) and/or the neuron module (120) for processing the compressed neuron addresses and compressed kernel addresses.

* * * * *